United States Patent [19]

Roydhouse

[11] 4,419,107

[45] Dec. 6, 1983

[54] MERCURY FILTERING APPARATUS AND METHOD

[76] Inventor: Richard H. Roydhouse, 4697 W. 3rd Ave., Vancouver, B.C., Canada, V6R 1N5

[21] Appl. No.: 343,797

[22] Filed: Jan. 29, 1982

Related U.S. Application Data

[63] Continuation-in-part of Ser. No. 205,467, Nov. 10, 1980, abandoned.

[51] Int. Cl.³ .............................................. B03C 3/00
[52] U.S. Cl. .............................................. 55/5; 55/72; 55/99; 55/154; 55/146; 55/446; 55/474; 420/527; 420/498; 420/526; 423/210 M; 266/148
[58] Field of Search ................... 55/474, 154, 5, 72, 55/2, 446, 131, 99, 146; 423/210 M; 75/169, 81; 420/526, 498; 266/148; 106/35

[56] References Cited

U.S. PATENT DOCUMENTS

| | | | |
|---|---|---|---|
| 913,941 | 3/1909 | Blake | 55/151 |
| 1,801,515 | 4/1931 | Marshall | 75/169 |
| 2,266,475 | 12/1941 | Ramsay | 75/72 |
| 2,579,445 | 12/1951 | Warburton | 55/128 |
| 2,696,893 | 12/1954 | Richardson | 55/129 |
| 2,974,747 | 3/1961 | Coolidge et al. | 55/130 |
| 3,232,033 | 2/1966 | Williston et al. | 55/524 |
| 3,619,176 | 11/1971 | Briody et al. | 75/81 |
| 3,662,523 | 5/1972 | Revoir | 55/72 |
| 3,814,799 | 6/1974 | Wygasch | 423/210 M |
| 3,877,898 | 4/1975 | Nomura et al. | 55/128 |

FOREIGN PATENT DOCUMENTS

| | | | |
|---|---|---|---|
| 331099 | 2/1916 | Fed. Rep. of Germany | 55/446 |
| 834510 | 8/1938 | France | 55/154 |

*Primary Examiner*—Bernard Nozick
*Attorney, Agent, or Firm*—Carver & Co.

[57] ABSTRACT

Mercury filter for collecting low concentration mercury vapor in gas. Filter has an absorber having a collecting surface of a material that amalgamates readily with mercury, the surface having a reactive tarnish produced by exposure of the plates to available iodine. The absorber can have spaced collecting members with the gas passing about the collecting members. Optionally at least one of the collecting members is at a higher electrical potential difference than the remaining member, which potential difference is insufficient for the filter to act as an electrostatic precipitator so as to reduce attraction of dust. An optional electrically insulating porous matrix can extend between the collecting members and should have sufficient porosity to permit air to flow relatively freely between the collecting members. Preferably the collecting surface is copper or silver plated copper, and the tarnish is the appropriate metallic iodine which can be produced by exposure of the gas to iodide monochloride prior to passing to the collecting surface.

19 Claims, 7 Drawing Figures

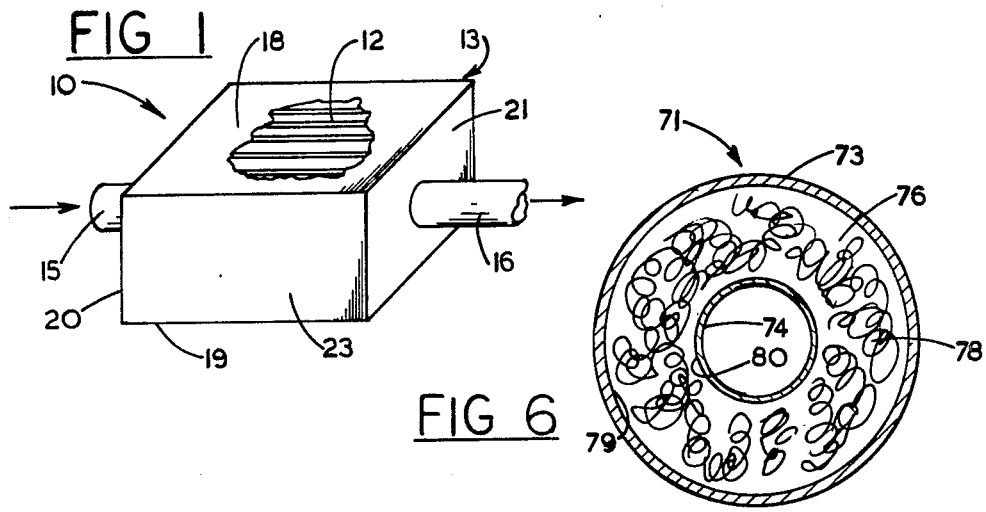
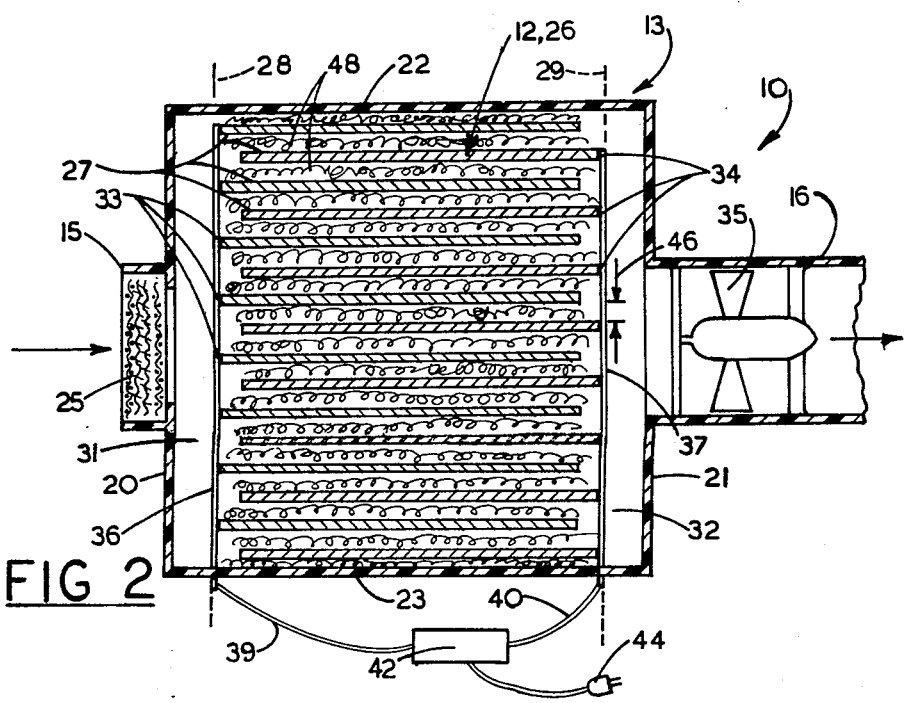

MERCURY FILTERING APPARATUS AND METHOD

CROSS REFERENCES TO RELATED APPLICATIONS

This is a continuation-in-part application of my co-pending application Ser. No. 06/205,467, filed Nov. 10, 1980 now abondoned and entitled MERCURY FILTERING APPARATUS AND METHOD.

BACKGROUND OF THE INVENTION

1. Field of the Invention

The invention relates to a filter for collecting mercury vapour or minute mercury droplets carried in a gas as a relatively low concentration, and the method of filtering the mercury from the gas stream.

2. Prior Art

Mercury has been known to be a toxic substance for many years, but has been difficult to collect in the vapour phase, that is as commonly found above a sample of metallic mercury at normal temperature and pressure. For convenience, in this specification, mercury in this phase is referred to as "mercury vapour" and could include, in some instances, discrete mercury droplets of very small size as might be found in industrial applications where mercury is handled.

A common source of mercury contamination is in dentists' offices where mercury vapour is frequently present during the preparation of amalgams for dental fillings. It can also occur in hospitals or laboratories when mercury thermometers have been broken and the mercury spilled. Because the concentration of mercury in these particular environments is relatively low, to the inventor's knowledge, very little work has been done in developing compact, low cost mercury filters to handle the low concentrations of these environments.

Mercury filters to use in environments similar to the present invention are disclosed in U.S. Pat. Nos. 3,956,458 issued to Anderson in 1976 and 4,139,354 issued to Giles in 1979. These patents both use a filter element which includes iodine impregnated charcoal particles encapsulated within a cavity through which air can pass. The first device also uses a sulphur filter and an electrostatic precipitator which complicates the structure considerably particularly due to high voltage requirements. These devices utilize the absorption power of iodine impregnated charcoal and do not utilize amalgamating properites of mercury as in the present invention. The present inventor considers that the filters disclosed in these two patents would have relatively short operating lives when compared with the filter of the present invention, ie. the filters would likely saturate more quickly, and, for a particular physical size of filter, would absorb mercury at a slower rate than the present invention. Also, for an effectiveness equal to the present invention, such filters would require an excessive amount of charcoal which would correspondingly require a larger, noisier fan than the present invention.

The present invention is particularly adapted for absorbing low concentrations of mercury in an air flow of low speed such as found in the above environments, and as such would require only a low powered fan. Clearly, with a suitable increase in size the invention could be used in higher concentrations contained in greater air flows as found in heavy duty industrial applications. To the inventor's knowledge, in industrial applications, mercury compounds only, but not mercury itself, are trapped in conventional electrostatic precipitations which are also used to trap other air borne contaminants. Conventional electrostatic precipitators usually include a stack of spaced plates or members, some of which are charged to a relatively high potential, for example 10 to 15 kilovolts. The precipitators commonly include means to vibrate the plates to collect contaminants collected thereon. These industrial filters are relatively complex structure which clearly would be relatively expensive and inappropriate for use in low concentration, small flow applications.

SUMMARY OF THE INVENTION

The present invention reduces difficulties and disadvantages of the prior art by providing a mercury vapour filter, particularly for use in a low concentration environment, as found in dentists' offices and hospitals. The filter of the invention does not saturate readily and can be easily and inexpensively rejuvenated. Efficiency of some embodiments of the invention can be improved by using a readily available low voltage source for charging collecting surfaces to a low potential difference and for operating a low powered fan. The low potential difference does not attract excessively atmospheric dust and thus the device does not require vibrating means for cleaning the surfaces and thus is essentially silent in operation. Furthermore, it occupies a very small volume, is relatively economical to use and service and, in some embodiments, can be serviced by merely replacing or by rejuvenating filter elements.

A mercury filter element according to the present invention is for collecting mercury carried in gas. The element is for use in a filter assembly having a container with an inlet and outlet and being adapted to pass the gas therethrough. The filter element is characterized by an absorbing means having a collecting surface exposed to the gas, the collecting surface being of a material that readily amalgamates with mercury and is selected from a group including copper, silver, gold, platinum and zinc. The collecting surface is also has, or is adapted to form, a reactive tarnish produced by exposure of the collecting surface to available iodine. In one embodiment, the filter element has a pair of collecting members spaced apart to permit flow of the gas thereabouts, the members having oppositely facing collecting surfaces. In another embodiment, the filter has means to expose the gas stream to iodine vapour in some form prior to passing between the collecting members, and, if desired, at least at some time, one of the collecting surfaces is at a higher electrical potential than the remaining surface. The collecting surfaces are of a size and are spaced apart such that any electrical potential gradient existing between the surfaces is insufficient for the surfaces to act as an electrostatic precipitator. Preferably an electrical insulating means extends between the collecting members to condense mercury thereon for subsequent transport to the collecting members.

A method of collecting mercury according to the invention is characterized by exposing gas containing mercury to an absorber means having a collecting surface of a material that readily amalgamates with mercury and is selected from a group including copper, silver, gold, platinum and zinc. The surface also has or is adapted to form a reactive tarnish produced by exposure of the collecting surface to available iodine. The gas can be exposed to iodine vapour in some form prior to passing between spaced collecting surfaces and, at least at some times, electrical potential can be applied to one of the surfaces so as to be at a higher potential than the remaining surface. The collecting surfaces are of a size and are spaced apart such that any electrical potential gradient existing between the surfaces is insufficient for the surfaces to act as an electrostatic precipitator.

A detailed disclosure following, related to drawings, describes several embodiments of the apparatus and method of the invention. The invention can be expressed in apparatus and method other than those particularly described and illustrated.

DESCRIPTION OF THE DRAWINGS

FIG. 1 is a simplified fragmented perspective of a filter according to the invention, FIG. 2 is a simplified fragmented top plan of the filter of FIG. 1, FIG. 6 is a simplified transverse section through a third embodiment.

DETAILED DISCLOSURE

FIGS. 1 and 2

Figure 3:
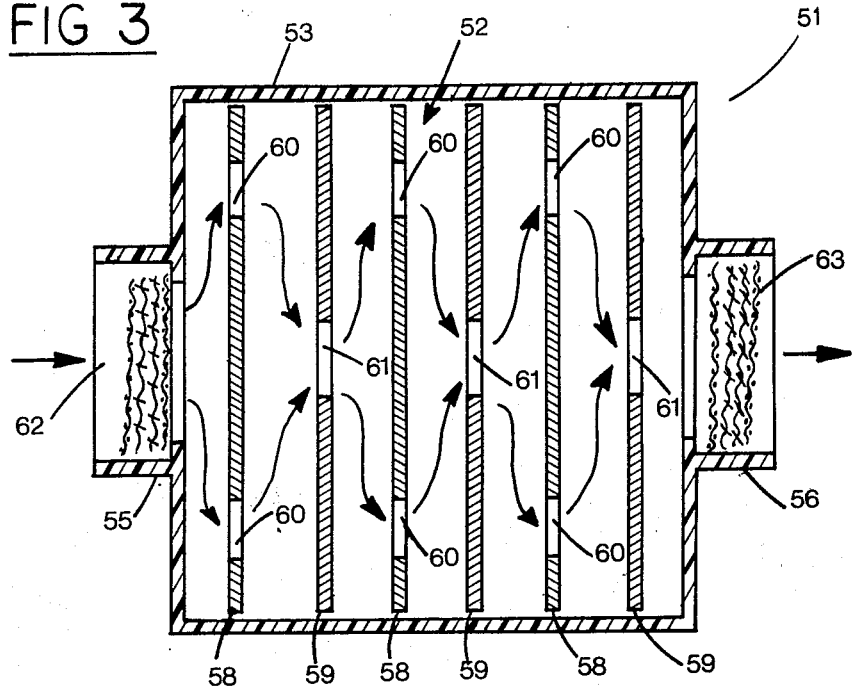
FIG. 3 is a simplified fragmented top plan of a second embodiment of the invention.

A mercury filter assembly 10 has a mercury filter element 12 according to the invention fitted within a container 13. The container has inlet and outlet pipes 15 and 16 and is adapted to pass an air stream therethrough in direction of undesignated arrows for collecting mercury vapour or droplets carried in the air stream. The filter is particularly for use in small enclosures of a controlled air supply, for example in dentists' offices and laboratories where mercury is handled, and the description is particularly directed to these applications. However, with routine design changes, larger capacity filters could be designed for use in other applications, for example industrial applications where larger volumes of mercury are handled. The mercury to be filtered is normally in the form of vapour, but, in some instances, can be in the form of very small droplets which could be carried in an air stream or in a gas stream other than air.

The container 13 has top and bottom walls 18 and 19, end walls 20 and 21 containing the inlet and outlet pipes respectively, and side walls 22 and 23 so as to form a generally rectangular box. The walls are preferably formed of an electrical insulator and are of a material that will not react with mercury. The inlet pipe 15 contains a porous pre-filter matrix 25 through which the gas passes freely before entering the container. The matrix forms a portion of the filter element 12 and contains a source of the element iodine and can be a spun glass pad or porous screen soaked in iodine monochloride, or equivalents which produce traces of free iodine in a form easily transportable with the gas stream.

Referring only to FIG. 2, the filter element 12 includes a plurality of spaced, parallel, relatively thin, flat rectangular collecting plates 26 which are stacked vertically and relatively closely together to form a grid with spaces between adjacent plates, each plate having oppositely facing collecting surfaces 27. The stack of plates extends laterally between the side walls 22 and 23, and each plate itself extends between the top and bottom walls 18 and 19. The plates are arranged in two sets 33 and 34 so that adjacent plates are staggered relative to each other. Thus, end edges of the sets of plates 33 and 34 project from the stack of plates in opposite directions and are disposed within two vertical planes 28 and 29 respectively, shown as broken lines, which are spaced from the end walls 20 and 21 as shown to provide inlet and outlet manifold spaces 31 and 32 as shown. A low powered fan 35 fitted in the outlet pipe 16 draws air containing mercury vapour through the inlet pipe 15 and through the porous matrix 25 where it is exposed to iodine prior to passing between the collecting surfaces and thus is upstream from the collecting surfaces. The air spreads laterally from the pipe 15 into the manifold 31 before passing between the stack of plates 26 and out into the outlet manifold 32, thence through the fan to exhaust.

An electrically conducting bus bar 36 extends across the stack of plates and makes electrical contact with an upper edge of each plate of the set of plates 33 projecting towards the inlet pipe, thus ensuring that all plates of that set are at the same electrical potential. Similarly, a second bus bar 37 makes electrical contact with upper edges of the set of plates 34 which project in the opposite direction towards the outlet pipe. Thus each plate is displaced longitudinally relative to adjacent plates on opposite sides thereof to project sufficiently to make contact with the respective bus bar as shown. Thus the adjacent plates on opposite sides of the projecting plates do not make contact with the same bus bar so that the plates of the two sets can be charged to different electrical potentials. Electrical wires 39 and 40 extend from the bus bars 36 and 37 to an electrical convertor bos 42 which has a plug 44 for plugging into a conventional electrical main socket, not shown. The convertor is an electrical device which produces low voltage direct current, ie. partially or fully rectified AC of a reduced voltage in the 6 to 12 volt range. One set of the plates therefore is at a higher electrical potential than the remaining set of plates at least some of the time. The plates 26 are about 10 cms. by about 15 cms. and are spaced from each other at a spacing 46 of about 1 cm., although the size is not critical and the range of spacing can be between 0.5 cm. and 3 cms. It is noted that the collecting surfaces are of a size and spaced apart such that any electrical potential gradient existing between the surfaces, ie. that might exist at any particular instant of time, is insufficient for the surfaces to act as an electrostatic precipitator. Use of low voltage results in the collecting surfaces being insufficiently charged to attract excessive amounts of dust, which would otherwise detract seriously from the filtering performance. In a conventional highly charged electrostatic precipitator filter, the dust requires to be removed essentially continuously and this increases cost and maintenance problems.

An electrically insulating porous matrix 48 occupies the spacing between the plates and has sufficient porosity to permit air to flow relatively freely between the plates. The matrix comprises a mass of thread-like members randomly extending between opposite surfaces of the plates and can be selected from a variety of materials such as polymers, for example polyamids, polyesters, polyethylenes. These materials also can be strips of sheet-like members having a thickness of between 0.1 mm. to 0.5 mm. with a width of between 0.5 mm. and 5 mms. Suitable mesh is available as plastic mesh polishing pads sold by the 3M Company, for use with power floor polishers, or manual scrubbing pads for cleaning pans. Alternatively, conventional spun glass can be used, such as is used in household insulation applications.

The collecting surfaces of the plates of the filter are of particular importance and serve as absorber means having a collecting surface faced with or of material that readily amalgamates with mercury. Such materials are metallic and known to be reactive with mercury, and can be selected from a group including copper, gold, platinum, silver and zinc. When the collecting surface is exposed to iodine, a discoloration occurs which, for convenience is called a reactive tarnish which is a metallic compound of iodine, presumably a metallic iodide produced by exposure of the collecting surface to iodine. Selection of material is dictated by economics and efficiency. It has been found that copper or silver plated copper which has been tarnished by exposure to iodine monochloride vapour is effective for applications described. To increase surface area of the collecting surfaces 27, corrugations or dimples can be provided so as to increase the surface area without materially increasing overall volume of the filter element 12.

OPERATION

In operation, the filter assembly 10 is connected to a mains electrical supply so as to charge the plates and to operate the fan. Gas, usually air, containing mercury is drawn through the pipe 15 and the porous matrix 25 where free iodine is picked up. The gas, now also containing free iodine vapour, is then distributed laterally and vertically by the inlet manifold 31 so as to flow between the plates, leaving the assembly via the outlet manifold 32 and outlet pipe 16. If the plates are being used for the first time, the iodine reacts with the metallic surface, forming the iodine compound in the so-called reactive tarnish. If the plates have been used before, the surface already has some iodide and the additional iodine merely reacts to maintain the reactive tarnish. As air containing mercury and iodine passes between the plates, it is forced into a turbulent flow condition by the insulating matrix 48 which randomly disturbs the air flow and slows it down. Turbulent flow is desirable because it increases the chances of collisions between molecules of mercury vapour or mercury droplets and the collecting plates. Any mercury contacting the collecting surfaces of the plates condenses thereon and amalgamates with the material of the plates, thus preventing re-evaporation of mercury from the plates into the air flow. Some mercury condenses on the insulating matrix and forms a film thereon which eventually communicates with the plates. There appears to be a tendency for mercury condensed on the matrix to be drawn along the matrix onto one of the plates, so that the mercury can then amalgamate with the plate surface material. Thus, the insulating matrix not only produces turbulent flow and slows flow of the gas, but also causes mercury to condense thereon for subsequent transport to the collecting plates for amalgamation on the collecting surfaces. Thus, it can be seen that the electrical insulating matrix serves as a means to produce turbulent flow in the gas stream passing between the collecting surfaces of the plates, and as a means to condense mercury between the plates and to transport the condensed mercury to the collecting surfaces.

Exposure of the collecting surfaces to iodine to form the reactive tarnish is of great importance, but the reason for this is not clear. It would seem that gas drawn through the porous pre-filter matrix 25 picks up the free iodine vapour that is present which then interacts with the collecting surfaces and/or mercury and a resultant reaction product appears on the surface as the reactive tarnish and enhances the collection of mercury thereon. Preferably gaseous iodine is used to produce a thin tarnish layer (ie. less than about 0.05 mms.) and it is noted that a much thicker tarnish layer tends to decrease accumulation and amalgamation. With copper plates the reaction implies copper, iodine and mercury and the compound produced appears to be copper-mercury iodide. This same compound can be produced on the surfaces by exposure of the plates to iodine vapour from solid iodine or from iodine dissolved in ethanol, or by coating the plates with copper iodide dissolved in a suitable solvent, eg. in an aqueous solution of sodium thiosulphate or equivalents. The tarnish must be sufficiently thin so that mercury reacting with the tarnish can be later absorbed into the material of the plates. It appears that the tarnish acts somewhat similarly to a catalyst or as an intermediary and transports the mercury from the surface into the plate material from which it is not released unless the plate is heated to above 300° C. Thus the material of the collecting surface and plate acts as a reservoir to store the captured mercury, and because the amalgamation holds the mercury relatively strongly, the mercury vapour is not easily released and thus re-emission of the mercury does not occur readily, thus contrasting with some prior art filters. As stated above a relatively thick tarnish layer is not very effective although the reason for this is not clear. For example, if the plates were made of copper and were dipped in a liquid containing iodine monochloride, an excessively thick coating appears on the plates and their effectiveness as collectors of mercury is reduced, possibly because a copper chloride is formed. If the matrix 25 looses effectiveness, it can be re-wetted with iodine monochloride, or replaced to rejuvenate or increase effectiveness of the plates without changing the collecting plates. Wick means, not shown, can be used to feed iodine monochloride from a supply to the matrix 25 to maintain effectiveness. Alternatively, the copper iodine solution as above referred to can be re-applied to rejuvenate the collecting surfaces. If the plates become saturated with mercury they can be heated to above 300° C. to drive off the mercury and then reused.

Several samples of the present invention have been manufactured and tested and found effective for removing mercury from air containing concentrations of mercury that are typical of dentists' offices. Mercury concentration meters have been fitted upstream and downstream from the filter and have shown considerable differences in readings, thus indicating the effectiveness of the device. It seems that the mercury that has amalgamated on the collecting surfaces is held relatively strongly and is not readily available for re-evaporation into the air stream, and thus the filter does not appear to saturate as readily as some other known filters. It is added here that it is common for a prior art filter to be effective initially, but after a few hours or days of use, there can be marked reduction in effectiveness because mercury collected in the filter appears to be re-evaporated into the gas flow. Filters according to the invention have been operated for a period equivalent to 12 months use in an average dentist's office, and the filter was still found to be 90% to 100% effective at the end of the period.

In summary, it can be seen that the method according to the invention is for collecting mercury from gas containing mercury in which the gas is exposed to an absorber means having a collecting surface of a material that amalgamates with mercury and is also adapted to form a reactive tarnish produced by exposure of the surface to available iodine. The method can be further characterized by passing the gas between collecting surfaces and exposing the gas stream to iodine prior to passing between the collecting surfaces which helps to maintain efficiency of collection. At least some of the time, an electrical potential can be applied to at least one of the collecting surfaces so as to be at a higher potential than the remaining surface. The method is further characterized by passing the gas flow around electrical insulating means extending between the collecting surfaces to cause some of the mercury within the gas flow to condense thereon for subsequent transport to the collecting surfaces. The air is preferably passed between the collecting surfaces at a speed of between about 10 cms. per second and 50 cms. per second and the voltage, for convenience and safety reasons should be in the range of between 6 and 12 volts because efficiency is not markedly increased by an increase in voltage. It can be seen that the collecting surfaces do not, in any manner, act as an electrostatic precipitator, as can be demonstrated by passing thick smoke through the device which is not absorbed.

ALTERNATIVE AND EQUIVALENTS

The filter element 12 as disclosed has a plurality of parallel collecting plates to provide a relatively large surface area for collecting mercury within a small volume of filter elements. Clearly, one pair of plates spaced apart to permit the flow of gas therebetween would function, and in fact other collecting members can be used as will be described. In general, the filter element requires an absorbing means having a collecting surface exposed to the gas and being of a material that readily amalgamates with mercury and is adapted to form a reactive tarnish produced by exposure of the gas to available iodine before or during operation.

Iodine monochloride placed upstream of the collecting surfaces provides one source of available iodine for producing the reactive tarnish on the plates concurrently when mixed with the mercury vapour. The tarnish is essential to enhance amalgamation so that the mercury is absorbed at a feasible rate, although other iodine compounds that produce free or available iodine at normal temperatures could be used for this purpose, as exemplified above. Also, iodine compounds can be applied to the plates as a thin reactive surface tarnish to enhance amalgamation of mercury as described. As previously described, copper iodide in a suitable solvent can be painted on the plates to provide copper iodide directly. Alternatively, other metallic iodides, in which the metal of the iodide is different from the metal of the collecting surface, can also be used, for example copper iodide solution could be painted on silver plated copper, or silver iodide solution could be painted on copper collecting surfaces. In all equivalents, the iodide or iodine compound must have iodine available for combination with the collecting surfaces to form the reactive tarnish. Some reactive tarnishes seem to be more prone to contamination than others. For example, silver as a collecting surface appears to lose effectiveness more quickly than copper, possibly due to contamination with other gases in the atmosphere.

Also, types of electrical insulating matrix other than those listed can be chosen, and in any event, the matrix must have sufficient porosity to permit air to flow relatively freely between the collecting members and to condense mercury thereon for later transport to the collecting members for amalgamation therewith. In some applications, low density, open cell foamed polymers, such as foamed polyurethane, may be suitable so that the matrix and plates would be relatively easy to replace if necessary, so that the container can be reused with separate elements.

In some applications, the insulating matrix can be omitted and the air can flow unimpeded between the plates and thus, mercury collected on the plates alone. This omission reduces efficiency somewhat, but is could have applications in areas where air flow between the plates is sufficiently turbulent so that the mercury molecules contact the collecting surfaces with sufficient frequency to filter effectively the air flow. To improve rate of collection of mercury, the collecting surfaces are made sufficiently long to provide adequate dwell times for most of the mercury molecules within the gas flow to contact the plates. If the gas flow between the plates is such that it is not turbulent, and furthermore, no matrix is provided, preferably means to induce turbulence into the gas flow are provided, for example rods fitted between, spaced from and parallel to the plates to serve as vortex generators to induce turbulence in the flow to increase the chance of collisions between mercury molecules and the collecting surfaces. In some applications, the filter is fairly effective without application of a voltage to the plates, but in general, the performance is enhanced by the low voltage as described.

Figure 4:
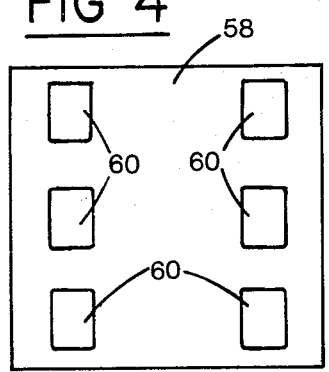
FIG. 4 is a front view of one type of collecting plate used in the FIG. 3 embodiment.
Figure 5:
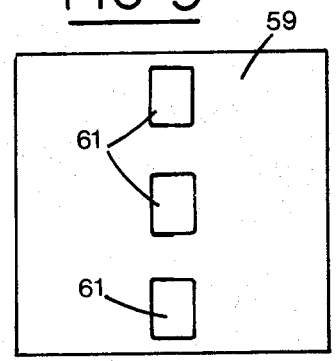
FIG. 5 is a front view of another type of collecting plate used in the FIG. 3 embodiment.
Figure 7:
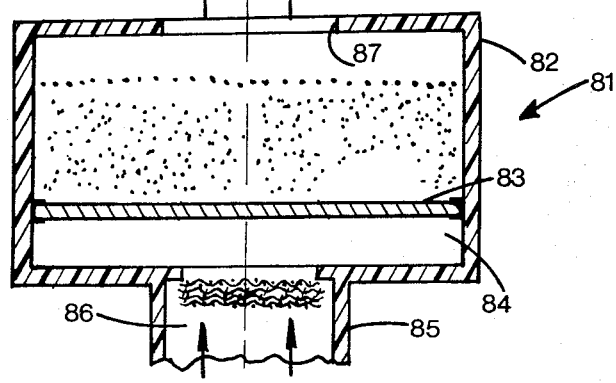
FIG. 7 is a transverse section through a fourth embodiment.

FIGS. 3 through 5

An alternative mercury filter assembly 51 has an alternative element 52 within a container 53. The container 53 is generally similar to the previous container and has ports 55 and 56 as shown to pass air into and out from the container. The alternative filter element 52 has a plurality of perforated collecting plates comprising two distinct sets of plates 58 and 59 of a material as previously described. As seen in FIG. 4, a typical plate 58 has two vertical rows of spaced openings 60, each row being adjacent an edge of the plate. As seen in FIG. 5, a typical plate 59 has a single vertical row of spaced openings 61 adjacent the center of the plate. As seen in FIG. 3, the plates 58 and 59 are arranged in spaced parallel alternating relationship between sides of the container containing the inlet and outlet ports so that the openings 60 and 61 are staggered and air passing through the element follows a generally sinuous route as shown by undesignated arrows. Porous pre-filter matrices 62 and 63 soaked in iodine monchloride are provided in the ports 55 and 56 respectively if the fan of the FIG. 1 embodiment is omitted and then alternating air flow through the filter element is possible due to ambient pressure differences. In this arrangement, generally the rate of mercury collection is lower due to lower flow rate, and if desired, a fan assist can be added, and the porous pre-filter matrix can be removed from the exhaust side of the filter. The electrically insulating porous matrix 48 and low voltage electrical charge applied to the plates of FIGS. 1 and 2 are not shown, but can be utilized if desired for enhanced performance.

FIG. 6

A further alternative mercury filter assembly 71 has a hollow tubular collecting member 73 enclosing an inner collecting member 74 to define an annular space 76 therebetween. The space 76 contains an electrical insulating porous matrix 78 and the members 73 and 74 are charged electrically to provide a potential difference therebetween similar to that previous described. Air enters one end of the annular space 76 and passes through a porous pre-filter matrix providing an iodine vapour generating source not shown, and then between oppositely facing collecting surfaces 79 and 80 of the tubular member and inner member, which surfaces are of a material that readily amalgamates with mercury as previously described, and if necessary a low potential difference can exist between these members.

FIG. 7

A further apparatus and structure incorporating the invention utilizes a filter element of a fluidized bed or suspended mass of particles of collecting material suspended in an upwardly flowing stream of gas containing mercury. As the principles of fluidized beds are well known, structural details are not shown or described. Briefly, a fluidized bed apparatus 81 has a container side wall 82 and porous bed bottom wall 83. The container has a plenum chamber 84 receiving pressurized gas through an intake duct 85 containing a porous pre-filter matrix 86 soaked in iodine monochloride. Purified gas leaves the apparatus through a duct 87. The suspended particles of the bed serve as an absorbing means having collecting surfaces exposed to the gas as previously described with reference to the collecting plates. The collecting surfaces are of a material that readily amalgamates with mercury also and have a reactive tranish produced by exposure of the gas to iodine, prior to fluidizing. Thus the particles can be a copper dust of a suitable size and the gas stream passing through a porous pre-filter matrix of iodine monochloride produces the reative surface tarnish on the copper dust which is of a size and density to be suspended in the gas stream, producing excellent turbulence and exposure of the gas to a large collecting surface area.

Alternatively, the particles can be of lightweight material, such as polyethylene or glass, coated with copper, silver or other metals for amalgamation, which is then exposed to iodine, either from the plenum chamber intake duct or beforehand, so as to form the reactive tarnish. The resulting low density particle permits use of a lower speed fluidizing air flow, with a corresponding reduction in fan power and noise. It can be seen that many different structural arrangements of filter elements can be devised that utilize the principle of this invention.

I claim:

1. A method of collecting mercury from gas containing mercury, the method being characterized by:
    (a) exposing the gas to an absorber means having a collecting surface of a material that readily amalgamates with mercury and is selected from a group including copper, silver, gold, platinum and zinc, the surface having a reactive tarnish produced by exposure of the collecting surface to available iodine.

2. A method as claimed in claim 1 further characterized by:
    (a) exposing the gas to available iodine prior to passing between the collecting surfaces so as to form the reactive tarnish.

3. A method as claimed in claim 1 further characterized by:
    a. exposing the gas to available iodine prior to passing between the collecting surfaces so as to form the reactive tarnish.

4. A method as claimed in claim 1, 2, or 3 further characterized by:
    (a) at least at some time, applying an electrical potential to one of the collecting surfaces so as to be at a higher potential than the remaining surface, the surfaces being of a size and spaced apart such that any electrical potential gradient existing between the surfaces is insufficient for the surfaces to act as an electrostatic precipitator.

5. A method as claimed in claim 1 wherein:
    (a) the absorbing means is a mass of particles of the material, the particles having collecting surfaces with the reactive tarnish,
    (b) fluidizing the particles with an upwardly flowing stream of the gas containing mercury.

6. A method as claimed in claim 5 where the gas is exposed to available iodine prior to fluidizing the particles.

7. A mercury filter element for collecting mercury carried in gas, the element being for use in a filter assembly having a container with an inlet and outlet and being adapted to pass the gas therethrough, the filter element being characterized by:
    (a) an abosrber means having a collecting surface exposed to the gas, the collecting surface being of a material that readily amalgamates with mercury and is selected from a group including copper, silver, gold, platinum and zinc, the surface having a reactive tarnish produced by expsoure of the collecting surface to available iodine.

8. A filter element as claimed in claim 7 in which the absorber means includes:
    (a) particles having the collecting surfaces and being of a size and density for use in a fluidized bed.

9. A filter element as claimed in claim 8 in which:
    (a) the fluidized bed has an intake which receives a flow of gas containing the mercury,
    (b) means to expose the gas to iodine prior to or whilst fluidizing the particles.

10. A filter element as claimed in claim 7 further characterized by:
    (a) means to expose the gas to iodine prior to passing between the collecting surfaces so as to create or maintain the reactive tarnish.

11. A filter element as claimed in claim 7 in which:
    (a) the reactive tarnish is a metallic compound of iodine.

12. A filter element as claimed in claim 7 or 11 further characterized by:
    (a) means to produce turbulent flow in the gas stream passing between the collecting surfaces.

13. A filter element as claimed in claim 7 in which the absorber means includes:
    (a) at least one pair of collecting surfaces spaced apart to permit flow of the gas thereabouts.

14. A filter element as claimed in claim 13 further characterized by:
    (a) an electrically insulating means extending between the collecting members and having sufficient porosity to permit air to flow relatively freely between the collecting members to condense mercury thereon for subsequent transport to the collecting members.

15. A filter element as claimed in claim 14 in which the electrically insulating means is made of a material selected from a group including polymers, such as polyamides, polyesters, polyethylenes and also spun glass wool.

16. A filter element as claimed in claim 13 further characterized by:
   (a) at least at some time, one of the collecting surfaces is at a higher electrical potential than the remaining collecting surface, the collecting surfaces being of a size and spaced apart such that any electrical potential gradient existing between the surfaces is insufficient for the surfaces to act as an electrostatic precipitator.

17. A filter element as claimed in claim 16 further characterized by:
   a. an electrically insulating means extending between the collecting members and having sufficient porosity to permit air to flow relatively freely between the collecting members to condense mercury thereon for subsequent transport to the collecting members.

18. A filter element as claimed in claim 7, 14, or 17 in which the absorbing means is characterized by:
   (a) a pair of generally plane plates having collecting surfaces faced with the said material.

19. A filter element as claimed in claim 7, 14, or 17 wherein the absorbing means is characterized by:
   (a) at least one hollow tubular member enclosing an inner member, the tubular member and inner member having collecting surfaces faced with the said material.

* * * * *